United States Patent
Tschache et al.

(10) Patent No.: US 10,581,811 B2
(45) Date of Patent: Mar. 3, 2020

(54) METHOD AND SYSTEM FOR ASYMMETRIC KEY DERIVATION

(71) Applicant: VOLKSWAGEN AG, Wolfsburg (DE)

(72) Inventors: Alexander Tschache, Wolfsburg (DE); Timo Winkelvos, Braunschweig (DE)

(73) Assignee: Volkswagen AG (DE)

( * ) Notice: Subject to any disclaimer, the term of this patent is extended or adjusted under 35 U.S.C. 154(b) by 31 days.

(21) Appl. No.: 15/290,109

(22) Filed: Oct. 11, 2016

(65) Prior Publication Data

US 2017/0111332 A1    Apr. 20, 2017

(30) Foreign Application Priority Data

Oct. 16, 2015    (DE) .................. 10 2015 220 227

(51) Int. Cl.
*H04L 29/06* (2006.01)
*H04L 9/08* (2006.01)
(Continued)

(52) U.S. Cl.
CPC ........ *H04L 63/0442* (2013.01); *H04L 9/0844* (2013.01); *H04L 9/0861* (2013.01);
(Continued)

(58) Field of Classification Search
CPC ..... H04L 9/08; H04L 63/0442; H04L 9/0861; H04L 9/3247; H04L 9/0844; H04L 9/366;
(Continued)

(56) References Cited

U.S. PATENT DOCUMENTS

| | | | |
|---|---|---|---|
| 8,385,553 B1* | 2/2013 | Jooste ................... | H04L 9/0822 380/277 |
| 2004/0151317 A1* | 8/2004 | Hyyppa ................ | H04W 12/04 380/277 |

(Continued)

FOREIGN PATENT DOCUMENTS

| | | |
|---|---|---|
| CN | 102325320 A | 1/2012 |
| CN | 102833072 A | 12/2012 |

(Continued)

OTHER PUBLICATIONS

Chapter 13: Key Management Techniques ; AJ Menezes, P Van Oorschot, S Vanstone—Handbook of Applied Cryptography, 1996 (Year: 1996).*

(Continued)

*Primary Examiner* — Alexander Lagor
*Assistant Examiner* — Vu V Tran
(74) *Attorney, Agent, or Firm* — Barnes & Thornburg LLP

(57) ABSTRACT

A method for asymmetrical key derivation by a signing entity for a terminal including introducing identical cryptographic material into the signing entity and into the terminal; deriving in each case a private key from the cryptographic material in the signing entity and in the terminal; calculating in each case a public key from the private key in the signing entity and in the terminal; generating a signature and/or a signed public key in the signing entity; transferring the signature and/or the signed public key from the signing entity into the terminal; and appending the signature of the signing entity to the public key in the terminal.

16 Claims, 2 Drawing Sheets

(51) Int. Cl.
 *H04L 9/32* (2006.01)
 *H04L 9/30* (2006.01)

(52) U.S. Cl.
 CPC ........ *H04L 9/3247* (2013.01); *H04L 63/0435* (2013.01); *H04L 63/061* (2013.01)

(58) Field of Classification Search
 CPC ....... H04L 9/32; H04L 9/3013; H04L 9/0869; H04L 9/0841; H04L 9/0825; H04L 9/0643; H04L 9/0631; H04L 63/061; H04L 63/0435; H04L 63/062
 See application file for complete search history.

(56) References Cited

U.S. PATENT DOCUMENTS

| | | | |
|---|---|---|---|
| 2010/0088523 | A1 | 4/2010 | Wooten |
| 2010/0183152 | A1* | 7/2010 | Hubner .................. H04L 9/083 380/270 |
| 2014/0122888 | A1 | 5/2014 | Yoon et al. |
| 2015/0333906 | A1* | 11/2015 | Rahman ................... G06F 7/58 380/44 |
| 2016/0072781 | A1* | 3/2016 | Zhang ................... H04L 63/065 726/4 |
| 2016/0261686 | A1* | 9/2016 | Onishi ................ H04L 63/0442 |
| 2016/0302061 | A1* | 10/2016 | Park ....................... H04W 12/04 |

FOREIGN PATENT DOCUMENTS

| | | |
|---|---|---|
| DE | 10336148 A1 | 3/2005 |
| DE | 502004000695 T2 | 4/2007 |
| DE | 102008018001 A1 | 10/2009 |
| DE | 102014208385 A1 | 12/2014 |
| EP | 1443795 A1 | 8/2004 |

OTHER PUBLICATIONS

AJ Menezes et al. (Menezes)—Handbook of Applied Cryptography, (Year: 1996).*
Menezes et al.; Handbook of Applied Cryptography; Chapter 8—Public-Key Encryption; pp. 283-319; 1996; CRC Press.
Search Report from German Patent Application No. 10 2015 220 227.5; Jun. 20, 2016.
Menezes et al.; Handbook of Applied Cryptography; Chapter 13—Key Management Techniques; pp. 543-590; 1996; CRC Press.
Office Action for Chinese Patent Application No. 201610894484.8, dated Oct. 23, 2019.

* cited by examiner

METHOD AND SYSTEM FOR ASYMMETRIC KEY DERIVATION

PRIORITY CLAIM

This patent application claims priority to German Patent Application No. 10 2015 220 227.5, filed 16 Oct. 2015, the disclosure of which is incorporated herein by reference in its entirety.

SUMMARY

Illustrative embodiments relate to a method and to a system for asymmetrical key derivation.

BRIEF DESCRIPTION OF THE DRAWINGS

The disclosed embodiments are explained below with reference to the appended drawings, in which.

DETAILED DESCRIPTION

Figure 1:
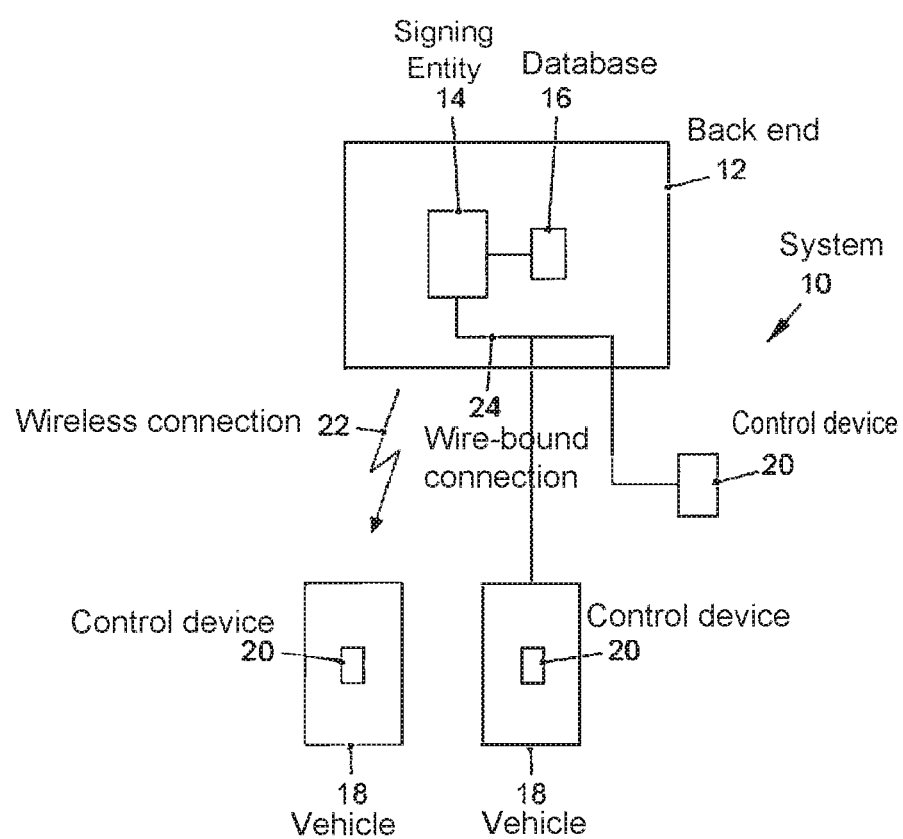
FIG. 1 shows a schematic illustration of a system for asymmetrical key derivation of a signing entity and a plurality of terminals.

The normal process of asymmetrical key derivation is that a terminal generates an asymmetrical key pair and transmits the public key which is produced in this context to a signing entity. The public key is signed there with the private key by the signing entity and transmitted back to the terminal. The terminal can then use the signed public key together with its private key for communication. Other communication partners can check the signature of the signing entity under the signed public key.

Such a signing process usually requires two communication processes: one for transmitting the public key to the signing entity and one for transmitting the signed public key back to the terminal. This may be problematic when inputting data into terminals in which a bilateral communication is not possible such as, for example, in vehicles. Therefore, this would rule out, for example, pre-calculation of data inputs for the production of vehicles.

Another solution is to cause both the private key and the public key to be generated by the signing entity. This only requires communication to transfer the public key and the private key to the terminal. However, it is critical here that the actually private key has to be transferred over potentially insecure channels. Furthermore, a storage requirement is generated at the signing entity DE 103 36 148 A1 discloses a method for signing a quantity of data in a public key system, in which a quantity of data is signed twice by two authorized persons.

DE 10 2014 208 385 A1 discloses a method for loading a plurality of software objects from a programming source, wherein different signatures of the programming source can also be processed without a certificate of the public key.

The disclosed embodiments improve the introduction of signed asymmetrical keys into a terminal.

The disclosed method for asymmetrical key derivation by a signing entity for a terminal comprises the operations: introducing identical cryptographic material into the signing entity and into the terminal; —deriving in each case a private key from the cryptographic material in the signing entity and in the terminal; calculating in each case a public key from the private key in the signing entity and in the terminal; generating a signature and/or a signed public key in the signing entity; transferring the signature and/or the signed public key from the signing entity into the terminal; and appending the signature of the signing entity to the public key in the terminal.

The disclosed method has the benefit that the signing entity does not have to transfer the safety-critical private key to the terminal. Instead, all that is necessary is to make a one-time transfer of the signature which is uncritical for safety and/or of the signed public key from the signing entity into the terminal. Furthermore, the signing entity does not have to keep the private key and the public key available as long as the cryptographic material remains stored, which constitutes a saving in terms of storage space. In addition, the terminal does not have to store the private or public key but instead can calculate it where necessary from the stored cryptographic material. Furthermore, it can be beneficial also then to be able to use an already existing infrastructure for symmetrical secrets for asymmetrical encryption.

Just one unidirectional communication into the terminal is necessary. There are terminals which cannot communicate reliably toward the outside at all, or at least not in an early stage of a production process, such as in the case of a vehicle. It is already sufficient merely to transfer the signature from the signing entity to the terminal, instead of transferring the signed public key, since the latter is also calculated in the terminal. On the other hand, the signed public key includes the signature of the signing entity. Also, the signing can take place at any time after the introduction of the cryptographic material, which permits independence in terms of timing. The introduction into the terminal can take place at another suitable location, such as at a supplier of a control device.

The disclosed method for asymmetrical key derivation can also be considered in such a way that the introduction of a key is included by transferring the signature and/or the signed public key into the terminal. After the transfer and the calculation of a signed public key in the terminal, the latter can then participate in communication which can be authenticated in a public key infrastructure (PKI).

The cryptographic material can comprise a common secret or a symmetrical key. Both can be implemented easily and only make small requirements of the signing entity and of the terminal. The cryptographic material can be a bit sequence. This bit sequence or the bit string can be of any desired length and therefore permits a high degree of flexibility.

The private key ($30a$, $30b$) can be a random number. In this context, a deterministic pseudo-random number is generated on the basis of the cryptographic material. This requires a deterministic, cryptographic pseudo-random function which can be easily developed, for example, with an AES (Advanced Encryption Standard) function. This pseudo-random number can then be used in various ways; either directly as an ECC private key or in a roundabout way as an RSA key. For RSA, an RSA key pair must also be derived deterministically, that is to say large prime numbers must be generated. For this there are prime number generators which use random numbers as an initial value and then supply prime numbers with corresponding computational expenditure. The process therefore remains deterministic. If sufficient computer power is made available, an RSA method can also be used.

The public key can be calculated by means of a Diffie-Hellman method or an elliptic curve Diffie-Hellman method. The public key is always generated from the secret parameters, which means that the private key is calculated first.

This applies to ECC and Diffie-Hellman methods. In the case of RSA methods, the secret parameters are generated first and the public and private keys are then calculated therefrom.

In this context, the public key is selected and the private key is calculated therefrom. These methods can be implemented easily and operate efficiently.

The private key can be calculated by means of a cryptographic pseudo-random function such as a hash function. The private key is derived in a cryptographically secure state from the cryptographic material. The hash value which is produced during a hash function, also referred to as a fingerprint, permits a secure and efficient method.

There can be provision that the cryptographic material is introduced in a secured environment of a manufacturer. The secured environment can comprise a production site and/or a back end of the manufacturer. The term secured environment can be interpreted in terms of security technology and is not exclusively geographic. For example, the cryptographic material can be produced and introduced in a backend, or in a computing unit or IT structure, under secure conditions.

There can also be provision that a supplier of the terminal provides it with a temporary cryptographic material and that the temporary cryptographic material becomes invalid if the cryptographic material is introduced into the terminal. The provisional cryptographic material is stored in the terminal during or after the manufacture and therefore extends the security range on components before they are installed in a composite device in which the terminal is installed. This increases the security further. The temporary cryptographic material can also be deleted. The temporary cryptographic material is made invalid or deleted in the same operation as the introduction of the signature. The introduction of the signature is protected on the basis of the temporary material.

The disclosed system for asymmetrical key derivation with a signing entity and a terminal provides that the signing entity and the terminal are configured to carry out a method as described above. The same benefits and modifications as described above apply.

The terminal can be a control device for a vehicle. The structure of a typical control device for a vehicle and the infrastructure or the system of a vehicle manufacturer with a central back end and a multiplicity of vehicles is suitable for the method or system according to exemplary embodiments.

The signing entity can be arranged in a back end of a vehicle manufacturer. In this central device, all the required components such as computer, database, network and safety components are available or can be made available easily and securely. In addition, data input processes are already carried out in the back end or in the production, but starting from the back end, which facilitates integration of the proposed asymmetrical key derivation.

The signing entity can be arranged in a distributed state. The signing entity can extend over a plurality of systems, for example, with an entity which keeps the cryptographic material available and on request returns only the public key, and another entity which then signs. Although a combined entity facilitates the data flow, since a plurality of entities have to communicate in a protected state, a distributed signing entity can have failsafety or added security as a result of the division of tasks and the associated need-to-know principle, that is to say knowledge only when necessary.

A plurality of terminals can be provided and a database in which the cryptographic material is assigned to the terminals can be provided. The cryptographic material, for example, a symmetrical key, can, of course, be used only for a single terminal, such as a vehicle or control device. Public and private keys do not have to be stored, since they can be derived from the cryptographic material again at any time. The database can be contained in the signing entity or connected to it.

Further disclosed embodiments emerge from the other features specified.

The disclosed embodiments which are specified in this application can, unless stated otherwise in an individual case, be combined with one another.

FIG. 1 shows an exemplary embodiment of a system 10 for asymmetrical key derivation. The example of a vehicle manufacturer is selected here. A signing entity 14 and a database 16 are arranged in a back end 12 of the vehicle manufacturer. The back end 12, the signing entity 14 and the database 16 are illustrated as dedicated units. It is possible to combine all or several elements, for example, in a server. The signing entity 14 can be embodied completely or partially as software.

In each case a terminal 20, for example, in a control device or some other computing device, is arranged in vehicles 18 of the vehicle manufacturer. At least the terminals 20 are associated with the system 10.

The back end 12 or the signing entity 14 communicates with the terminals 20. This can be implemented via a wireless connection 22 such as, for example, a WLAN or mobile radio network or via a wire-bound connection 24 such as, for example, a cable or ethernet. It is necessary to distinguish between two types of connection. The first type, which is essentially considered here, is implemented in a secured environment of the manufacturer. This may be the case, for example, during the production of the vehicle 20 within a factory. The second type of connection is a connection outside a secured environment of the manufacturer. This is the case, for example, in vehicles which have already been sold or are in the driving mode. These vehicles can communicate with the back end 12 via, for example, a mobile radio network, or via the internet in a factory. These tend to be insecure connections. However, this second type of connection can also be used for the asymmetrical key derivation and introduction of keys presented here if the communication is protected. In the text which follows, the first type of connection within a secured environment of the manufacture is presented.

Finally, it is possible for a terminal 20 to communicate directly with the back end 12 or with the signing entity 14. This can be the case, for example, during the production of the terminal 20 or the vehicle 18 or when the terminal 20 is replaced. This communication will then usually take place via the wire-bound connection 24, but can also be implemented via the wireless connection 22.

In the database 16 there is provision that information relating, inter alia, to the cryptographic material used is assigned to the terminals 20 or the vehicles 18.

Figure 2:
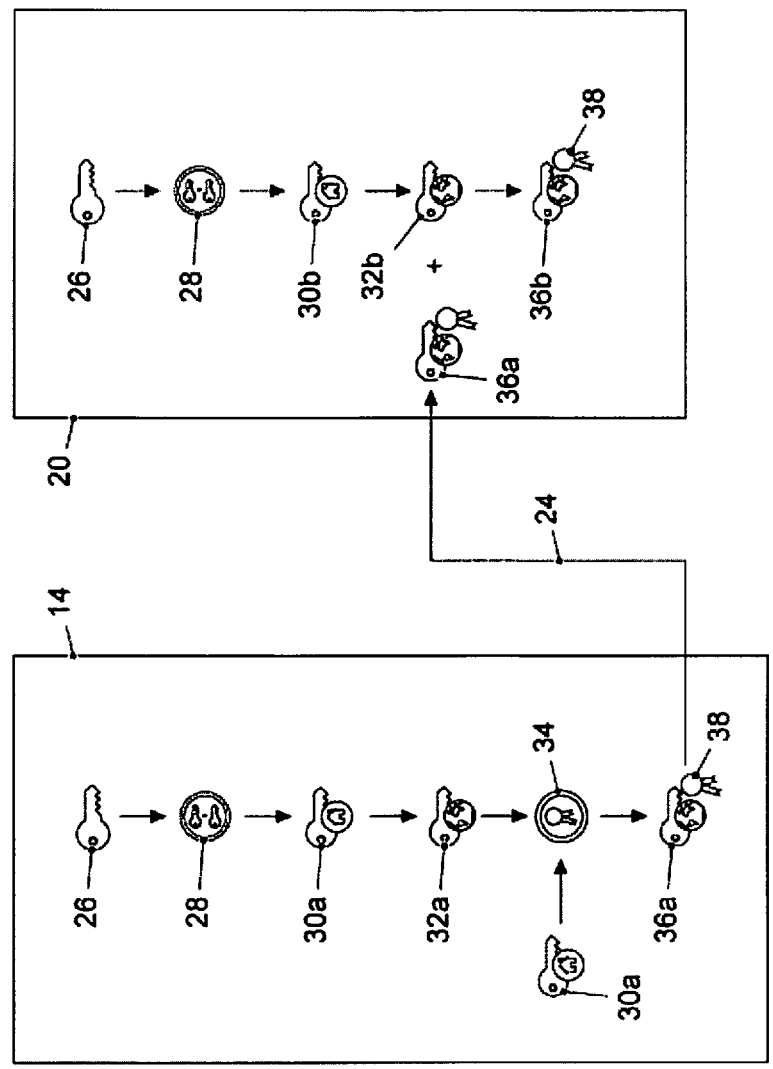
FIG. 2 shows a schematic illustration of asymmetrical key derivation with a signing entity and a terminal.

A method for asymmetrical key derivation with a signing entity 14 and a terminal 20 will now be described with reference to FIG. 2. Here, for example, the database 16 of the cryptographic materials corresponds to the signing entity 14. Firstly, an identical cryptographic material 26 is introduced into the signing entity 14 and into the terminal 20. The cryptographic material 26 can be a common secret or a symmetrical key. During the production of the vehicle 18, in which the terminal 20 is installed, or during the production of the terminal 20, that is to say before the production of the vehicle, the cryptographic material 26 is introduced into the terminal 20 in a secured environment or via a secured transfer path. The term introduction includes also the production of the cryptographic material 26 in the signing entity 14 and the subsequent introduction into the terminal 20. The introduction can be implemented, for example, via the connection 24. This connection 24 can be configured unidirectionally from the signing entity 14 to the terminal 20 and be arranged physically at the production site.

Subsequently, the derivation or the key derivation 28 of in each case one private key from the cryptographic material 26 is carried out both in the signing entity 14 and in the terminal 20. In this context, a private key 30a is generated in the signing entity 14, and a private key 30b is generated in the terminal 20. The two private keys 30a and 30b are, of course, identical.

A public key 32a is calculated from this private key 30a in the signing entity 14. Correspondingly, a public key 32b is calculated from the private key 30b in the terminal 20. The two public keys 32a and 32b are, of course, identical.

At the signing 34 which now takes place in the signing entity 14, the public key 32a of the signing entity 14 is signed with the private key 30a of the signing entity 14. In this context, a signed public key 36a or a signature 38 is calculated or generated. The signature 38 represents the authorship and the integrity of the public key 32a or of the signed public key 36a. The signature 38 can then be verified by a third party with the public key which is associated with the private key 30a.

The signed public key 36a or the signature 38 which have been generated by the signing entity 14 are transferred to the terminal 20. This can be implemented, for example, via the connection 24. In cryptographic terms, the signed public key 36a is associated with the terminal 20. It has been, as it were, generated by the signing entity 14 on behalf of the terminal 20.

In the terminal 20, the signature 38 of the signing entity 14 is appended or attached to the public key 32b of the terminal 20, with the result that a signed public key 36b of the terminal 20 is generated. The terminal 20 can then use this signed public key 36b to participate in communication which can be authenticated in a public key infrastructure (PKI).

The signature 38 can be directly appended if only the signature 38 has been transferred from the signing entity 14 to the terminal 20, or the signature 38 is firstly extracted from the signed public key 36a of the signing entity 14 if the latter has been transferred from the signing entity 14 to the terminal 20. Alternatively, the signed public key 36a can also be transferred. This is appropriate if the signed public key 36a is embedded in a certificate which cannot be easily reconstructed by the terminal.

The sequences which are described in parallel in the two units of the signing entity 14 and terminal 20 here do not have to be carried out in parallel but rather can run largely independently of one another. The starting point is always the presence of the cryptographic material 26. The terminal requires the signature 38 and/or the signed public key 36a from the signing entity 14 to produce the signed public key 36b. After successful running of the method, the signed public key 36b of the terminal 20 and the signed public key 36a generated by the signing entity 14 are identical. This is the case because both entities, that is to say the signing entity 14 and the terminal 20, start from the identical secret 26. In the event of a terminal not starting from the secret 26, in this case the generation of a signed public key in the terminal does not function.

It is apparent that only one unidirectional communication into the terminal is necessary and nevertheless full security is ensured.

LIST OF REFERENCE NUMBERS

10 System
12 Back end
14 Signing entity
16 Database
18 Vehicle
20 Control device
22 Wireless connection
24 Wire-bound connection
26 Cryptographic material
28 Key derivation
30a Private key
30b Private key
32a Public key
32b Public key
34 Signing
36a Signed public key
36b Signed public key
38 Signature

The invention claimed is:

1. A method for asymmetrical key derivation by a signing entity for a computer terminal, the method comprising:
   introducing identical cryptographic material into the signing entity and into the computer terminal; deriving, in each case, a private key from the cryptographic material in the signing entity and in the computer terminal;
   calculating, in each case, a public key from the private key in the signing entity and in the computer terminal;
   generating a signature and/or a signed public key in the signing entity;
   transferring the signature and/or the signed public key from the signing entity into the computer terminal; and
   appending the signature of the signing entity to the public key in the computer terminal,
   wherein the method comprises only one unidirectional communication between the signing entity and the computer terminal per asymmetrical key derivation using the signature or the signed public key of the signing entity, wherein the cryptographic material is introduced in a secured environment of a manufacturer, and
   wherein a supplier of the computer terminal provides the computer terminal with a temporary cryptographic material and the temporary cryptographic material is made invalid or deleted in response to the cryptographic material being introduced into the computer terminal and communication of the signature.

2. The method of claim 1, wherein the cryptographic material comprises a common secret or a symmetrical key.

3. The method of claim 1, wherein the cryptographic material is a bit sequence.

4. The method of claim 1, wherein the private key is a random number.

5. The method of claim 1, wherein the public key is calculated by a Diffie-Hellman method, an elliptic curve Diffie-Hellman method, or an RSA method.

6. The method of claim 1, wherein the private key is calculated by a cryptographic pseudo-random function.

7. A system for asymmetrical key derivation with a signing entity and a computer terminal, the system comprising:
   a signing entity and a computer terminal, wherein the signing entity and the computer terminal carry out a method for asymmetrical key derivation by the signing entity for the computer terminal, wherein identical cryptographic material are introduced into the signing entity and into the computer terminal, in each case, a private key is derived from the cryptographic material in the signing entity and in the computer terminal, in each case, a public key is calculated from the private key in the signing entity and in the computer terminal, a signature is generated in the signing entity, the signature is transferred from the signing entity into the computer terminal, and the signature of the signing entity is appended to the public key in the computer terminal, wherein the transferred signature is the only communication between the signing entity and the computer terminal to derive the asymmetrical keys wherein the cryptographic material is introduced in a secured environment of a manufacturer, and wherein a supplier of the computer terminal provides the computer terminal with a temporary cryptographic material and the temporary cryptographic material is made invalid or deleted in response to the cryptographic material being introduced into the computer terminal and communication of the signature.

8. The system of claim 7, wherein the cryptographic material comprises a common secret or a symmetrical key.

9. The system of claim 7, wherein the cryptographic material is a bit sequence.

10. The system of claim 7, wherein the private key is a random number.

11. The system of claim 7, wherein the public key is calculated by a Diffie-Hellman method, an elliptic curve Diffie-Hellman method, or an RSA method.

12. The system of claim 7, wherein the private key is calculated by a cryptographic pseudo-random function.

13. The system of claim 7, wherein the computer terminal is a control device for a vehicle.

14. The system of claim 7, wherein the signing entity is arranged in a back end of a vehicle manufacturer.

15. The system of claim 14, wherein the signing entity is arranged in a distributed state.

16. The system of claim 7, wherein a plurality of terminals are provided, and a database is provided in which the cryptographic material is assigned to the computer terminals.

* * * * *